(12) United States Patent
Winton

(10) Patent No.: US 7,157,961 B2
(45) Date of Patent: Jan. 2, 2007

(54) MOS CHARGE PUMP

(75) Inventor: Raymond S. Winton, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 148 days.

(21) Appl. No.: 11/047,668

(22) Filed: Feb. 2, 2005

(65) Prior Publication Data
US 2005/0174163 A1    Aug. 11, 2005

Related U.S. Application Data

(60) Provisional application No. 60/541,828, filed on Feb. 5, 2004.

(51) Int. Cl.
*G05F 1/10*     (2006.01)
*G05F 3/02*     (2006.01)

(52) U.S. Cl. ..................................... 327/536
(58) Field of Classification Search ................. 327/536
See application file for complete search history.

(56) References Cited

U.S. PATENT DOCUMENTS

| | | | |
|---|---|---|---|
| 6,137,344 A | 10/2000 | Miki | 327/536 |
| 6,166,585 A | 12/2000 | Bazzani | 327/536 |
| 6,198,342 B1 | 3/2001 | Kawai | 327/536 |
| 6,501,325 B1 | 12/2002 | Meng | 327/536 |
| 6,549,064 B1 | 4/2003 | Bandy et al. | 327/536 |
| 6,819,162 B1 | 11/2004 | Pelliconi | 327/536 |
| 6,864,738 B1 * | 3/2005 | Du et al. | 327/536 |
| 2002/0149416 A1 * | 10/2002 | Bandy et al. | 327/536 |

* cited by examiner

*Primary Examiner*—Quan Tra
(74) *Attorney, Agent, or Firm*—DLA Piper US LLP

(57) ABSTRACT

A passive charge pump includes a plurality of stages or a single stage, with each stage including only two MOS transistors. Both of the transistors are configured in a transcapacitance configuration, and both transistors are primarily in the accumulation mode during operation. Embodiments of the charge pump rely entirely on the MOS capacitance and its embedded diode features to perform the necessary charge accumulation and transfer process necessary for voltage multiplication at the output and do not require any collateral capacitors and diodes. The charge pump may be embodied in an MOS technology, nMOS, pMOS, or CMOS.

22 Claims, 4 Drawing Sheets

MOS CHARGE PUMP

This application claims priority from U.S. Provisional Application Ser. No. 60/541,828 filed Feb. 5, 2004. The entirety of that provisional application is incorporated herein by reference.

BACKGROUND

1. Field of the Invention

The present application relates to charge pumps and more particularly to charge pumps suitable for use in integrated circuits.

2. Background of the Technology

A charge pump is a circuit topology that is designed to produce a voltage at a higher potential than that provided by a source. Charge pumps may be used in a wide variety of applications, including, but not limited to, serving as power supplies for passive RFID (radio frequency identification) circuits.

If the source/input to the charge pump is of single polarity, a charge pump generically must be of the form disclosed by IEEE Journal of Solid-State Circuits, vol. SC-11, No. 3, (June 1976), using different clock phases. Most MOS charge pumps are of this form, as reflected by U.S. Pat. Nos. 6,137,344, 6,198,342, and 6,501,325. This form of charge pump relies on alternate phases of a clock to spill the charges through the MOS device while it is in a conduction mode, and block the reverse flow of charge back through the device by a clock phase that turns the device off during the back cycle. This form of charge pump is an active-mode charge pump, requiring external clocks and power rails.

If the source is of alternating polarity voltage, whether sinusoidal power source or radio-frequency signal, then the charge pump is of the form of an AC-DC converter, and the sequence of charge pump stages provides a single polarity output with voltage multiplication. The source must be of alternating polarity for the charge to be lifted to higher voltage levels at the output, with the MOS device as a diode construct. This form of charge pump is a passive-mode charge pump, requiring no external clock phases or power rails. The passive mode type of charge pump is fairly rare. The only known examples are U.S. Pat. Nos. 6,549,064 and 6,819,162. The charge pumps disclosed by these two patents use a mix of capacitors and MOSFETs. For U.S. Pat. No. 6,549,064 each stage consists of 3 MOSFETs and 2 capacitors, with two of the MOSFETs configured to act as diodes and the remaining transistor configured as a regular MOSFET device. U.S. Pat. No. 6,819,162 a negative voltage is induced by a plurality of pump stages, with each stage consisting of 4 MOSFETS, 4 diodes, and 2 capacitors.

All charge pumps require a diode-capacitance action in order to accomplish the capture and accumulation of charge, relying on either clock phasing or alternating polarity to invoke the on-off diode action necessary for functionality. Even though the MOSFET is a capacitance construct is unusual to use the MOSFET as a capacitor. The only known instance in which MOSFETs are used in this manner is U.S. Pat. No. 6,166,585. For this patent, the MOS capacitances are devised as simple capacitors, driven by phased clocks and supplied by power rails as an active mode form of charge pump.

The charge pumps disclosed in the aforementioned prior art suffer from various drawbacks, including either a need for external clock circuitry or overly complex designs using a mix of capacitors, diodes and MOSFETs.

SUMMARY

The aforementioned issues are addressed to a great extent by a new charge pump that includes a plurality of stages or a single stage, each of which includes two MOS transistors with no need of collateral capacitances or diodes. Each transistor is configured to operate as a transcapacitance in the accumulation mode. Preferred embodiments of the charge pump make no use of any capacitor except that of the MOS capacitance and no use of any diodes except that of the embedded diode features of the MOS transistor. This charge pump may be realized in any MOS technology. In some embodiments, the nMOS technology is employed. Other embodiments make use of a pMOS or a CMOS technology. The topology described herein is unique because it uses the MOSFET devices as transcapacitances rather than as transistors, thereby eliminating the need to have separate and distinct capacitances and/or diodes, as is conventional for most charge pump constructs.

BRIEF DESCRIPTION OF THE FIGURES

The aforementioned advantages and features will be more readily understood with reference to the following detailed description and the accompanying drawings in which.

DETAILED DESCRIPTION

In the following detailed description, a plurality of specific details, such as numbers of charge pump stages and input and output voltages, are set forth in order to provide a thorough understanding of the embodiments described herein. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

Figure 1:
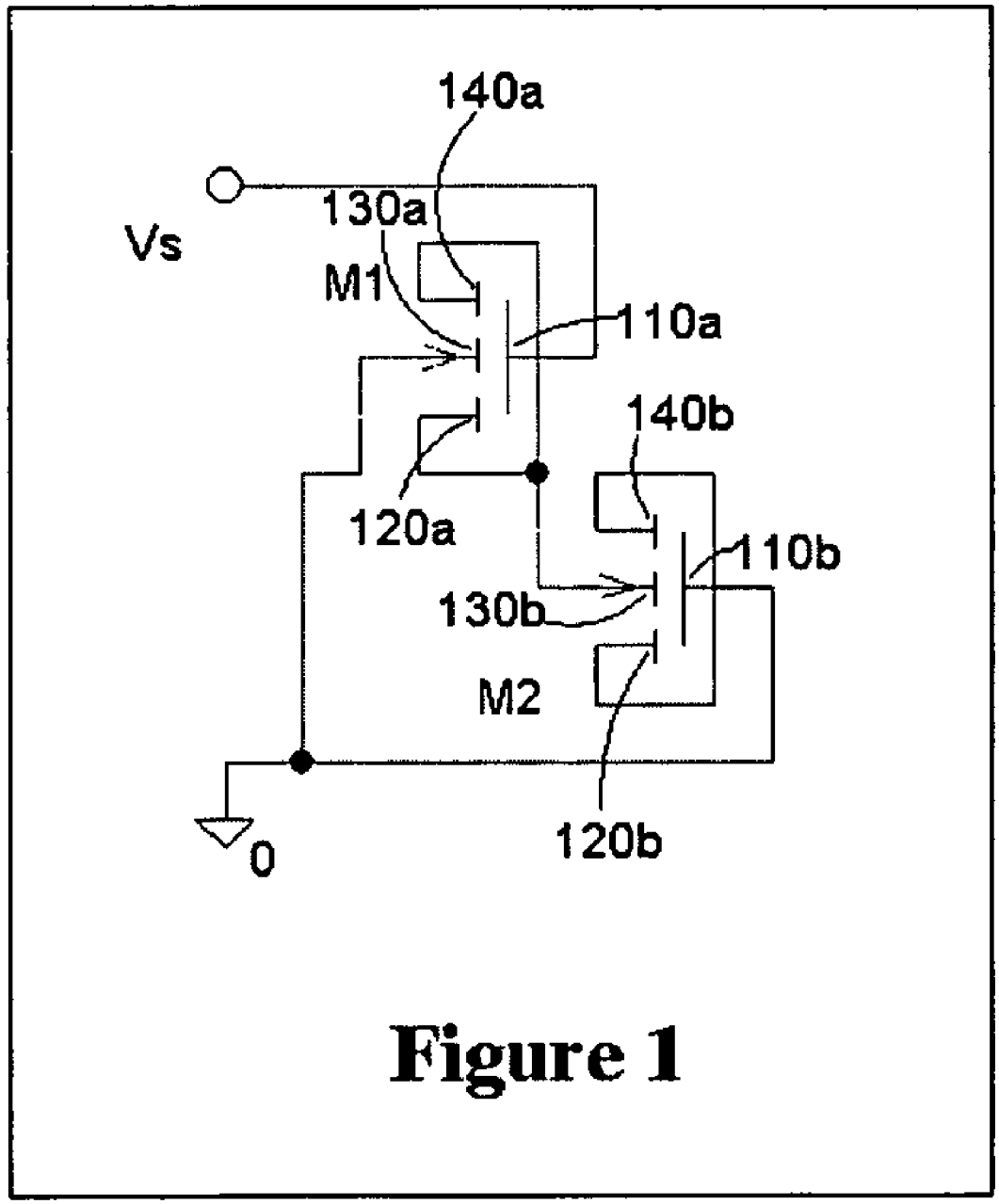
FIG. 1 is a schematic diagram of a single stage of an NMOS charge pump, consisting of two transistors configured in the transcapacitance (transfer capacitance) orientation.

A single stage 100 of a charge pump according to one embodiment is illustrated in FIG. 1. The stage 100 includes two MOSFETs, M1 and M2. Each of the transistors M1, M2 have four terminals, commonly identified as gate 110, source 120, drain 140, and body 130. The body of the transistors M1, M2 is of opposite type to both that of the source 120 and drain 140 materials, which are usually implanted, as well as opposite in type to that of the field-induced channel. The gate 110 of each transistor M1, M2 is isolated from the induced surface charge layer and the body 130 by a thin-layer insulator, typically an oxide, that forms a 'MOS' (metal-oxide-semiconductor) capacitive junction on the order of 1-2 fF per μm². Charge may be accumulated on the opposite sides of the insulating oxide layer of the MOS sandwich.

The input signal is connected across two terminals, also called input nodes, as represented by FIG. 1. One of these nodes is designated as ground and the other is designated as the source signal node Vs. The source is an alternating polarity signal, so the source node Vs will alternate between two levels that are nominally equal and opposite in polarity about the ground (or neutral) node at a frequency peculiar to the origin of the source.

The body 130a of the first nMOS transistor, M1, is connected to ground. Its drain 140a and source 120a are connected together. Its gate 130a is connected to the input signal node Vs. The transistor M1, by virtue of the intrinsic diode-capacitance junction, captures charge on the accumulation surface layer at the semiconductor-oxide interface. The charge accumulates as result of applied potential and the intrinsic MOS gate-to-body capacitance. The potential across the MOS capacitance will be switched in polarity by the alternating potential of the signal from the source Vs and force the charge to flow from the accumulation layer and onto the drain and source nodes 140a, 120a. This MOS capacitance is therefore called the "pumping" transfer capacitance, which may be more correctly defined as a "pumping transcapacitance" since it is a MOS transistor used in a capacitive charge-transfer mode rather than a trans-resistance (transistor) mode.

The body terminal 130b of the second nMOS transistor, M2, is connected to the joined drain and source nodes 140a, 120a of the first nMOS transistor M1. The drain and source terminals 140b, 120b of transistor M2 are connected together. The gate terminal 110b is connected to ground. The body of transistor M2, as well as all others, must be isolated from other transistors by means of an implanted or diffused well or by other means.

The topology of the transistor M2 reacts to the "pumping action" of the first nMOS transistor M1. As result of the intrinsic diode-capacitance junction of the nMOS device, the diode action of both transistors M1, M2 prevents the charge from flowing backwards, and the MOS capacitance of the transistor M2 therefore accumulates the charge that is pumped by transistor M1. The nMOS device and intrinsic gate-body capacitance of transistor M2 is therefore called the "accumulation transcapacitance."

Figure 2:
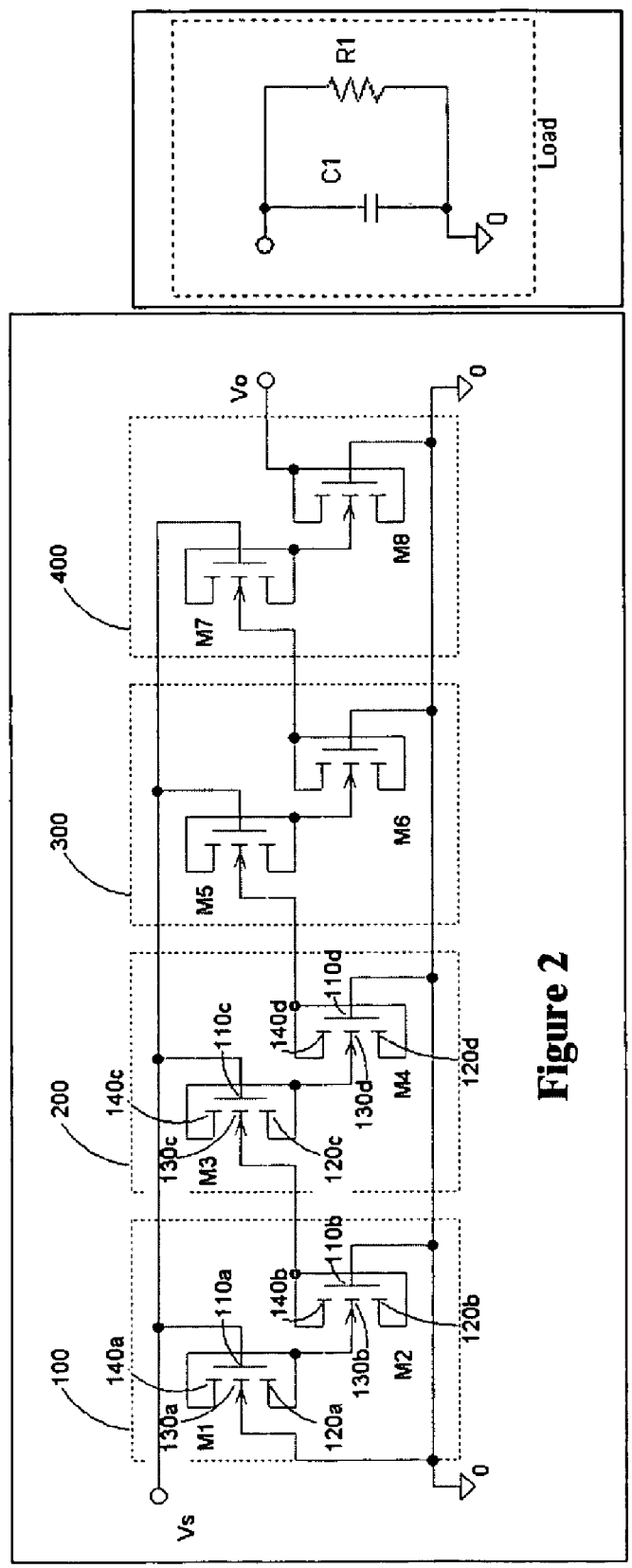
FIG. 2 is a schematic diagram of a four-stage NMOS charge pump utilizing the stage of FIG. 1.

As discussed above, FIG. 1 illustrates a single stage 100 of a charge pump. A four stage charge pump is illustrated in FIG. 2. The two transistors M1 and M2 of FIG. 1 comprise what will be defined as the first stage 100 of the charge pump, with output node being that of the joined drain and source nodes 140b, 120b of transistor M2. The body terminal 130c of the next transistor in the sequence, M3 (the first transistor of the second stage 200), is connected to the output drain and source terminals 140b, 120b of transistor M2 of the first stage 100. The gate terminal 110c of transistor M3 is connected to the input signal node Vs. The drain and source terminals 140c, 120c of transistor M3 are connected together, and form a next-stage "pumping transcapacitance" in the same manner as that of the capacitor M1 of the first stage 100.

The body terminal 130d of the next transistor (M4) in the second stage is connected to the joined drain and source terminals 140c, 120c of transistor M3. The drain and source terminals 140d, 120d of M4 are connected together. The gate terminal 110d of transistor M4 is connected to ground. The intrinsic diode-capacitance action of the NMOS device M4 forms the second-stage "accumulation transcapacitance."

The two transistors M3 and M4 thereby comprise what can be defined as the second stage of the charge pump, with output at the joined drain and source nodes 140d, 120d of transistor M4.

Connection of the transistors in successive stages 300, 400 (and as many additional stages as desired) is continued in the same manner, with joined drain and source nodes of each transistor in the sequence connected to the body of the next transistor, and gates alternately connected to ground and input signal, as shown in FIG. 2. This results in the formation of a sequence, or plurality, of stages, connected as described above, with exception only of the first transistor, as represented by M1 and the last transistor, as represented by M8. The first transistor is connected as described above. The joined drain and source nodes of the last transistor M8 are directed to a load capacitance CL. Because the stages are successive and sequential, the potential from one stage adds to the next stage.

FIG. 2 is a construct that represents four stages, made up of transistors M1, M2, M3, M4, M5, M6, M7, and M8, respectively. Transistors M1, M3, M5 and M7 are the "pumping transcapacitances," and transistors M2, M4, M6, and M8 are the "accumulation transcapacitances." Ideally, each stage adds a potential of twice the amplitude of the signal. For FIG. 2, the difference between the output nodes is then ideally eight times the voltage amplitude of the input AC signal. The charge pump topology can have as many stages as desired, to produce an ideal output voltage that is 2*N higher than the input source amplitude, where N is the number of stages.

If the intrinsic diode-capacitance MOS transistor junction is not ideal (which will be the case in a practical circuit), then the 2*N amplitude multiplication factor is reduced. Gate thresholds must also be exceeded, which also reduces the multiplication factor. But as long as the multiplication factor is greater than unity, the charge is accumulating and usable energy is stored on the capacitance across the output. The output of the charge pump is directed to a storage capacitance placed across the output nodes, such as indicated by capacitance CL in FIG. 2. This storage capacitance can then serve as a transient power source for an integrated circuit load, which in FIG. 2 is represented by the resistor R1 in parallel with the capacitance CL.

The substrate-to-well capacitance can also be used as a storage capacitance, for which the circuit will then be of the form of a three-dimensional charge accumulation construct.

For an nMOS charge pump such as that shown in FIG. 2, the polarity at the output will be positive relative to ground. If the construct were designed in terms of pMOS transistors, the output would be negative relative to ground. If both constructs are used, as in a CMOS (complementary MOS) version, the output nodes would then be of opposite polarities and would be taken in push-pull between the outputs. For the CMOS version the technology would have to be of triple-well form, otherwise one of the polarities would be shorted out by the substrate.

Figure 3:
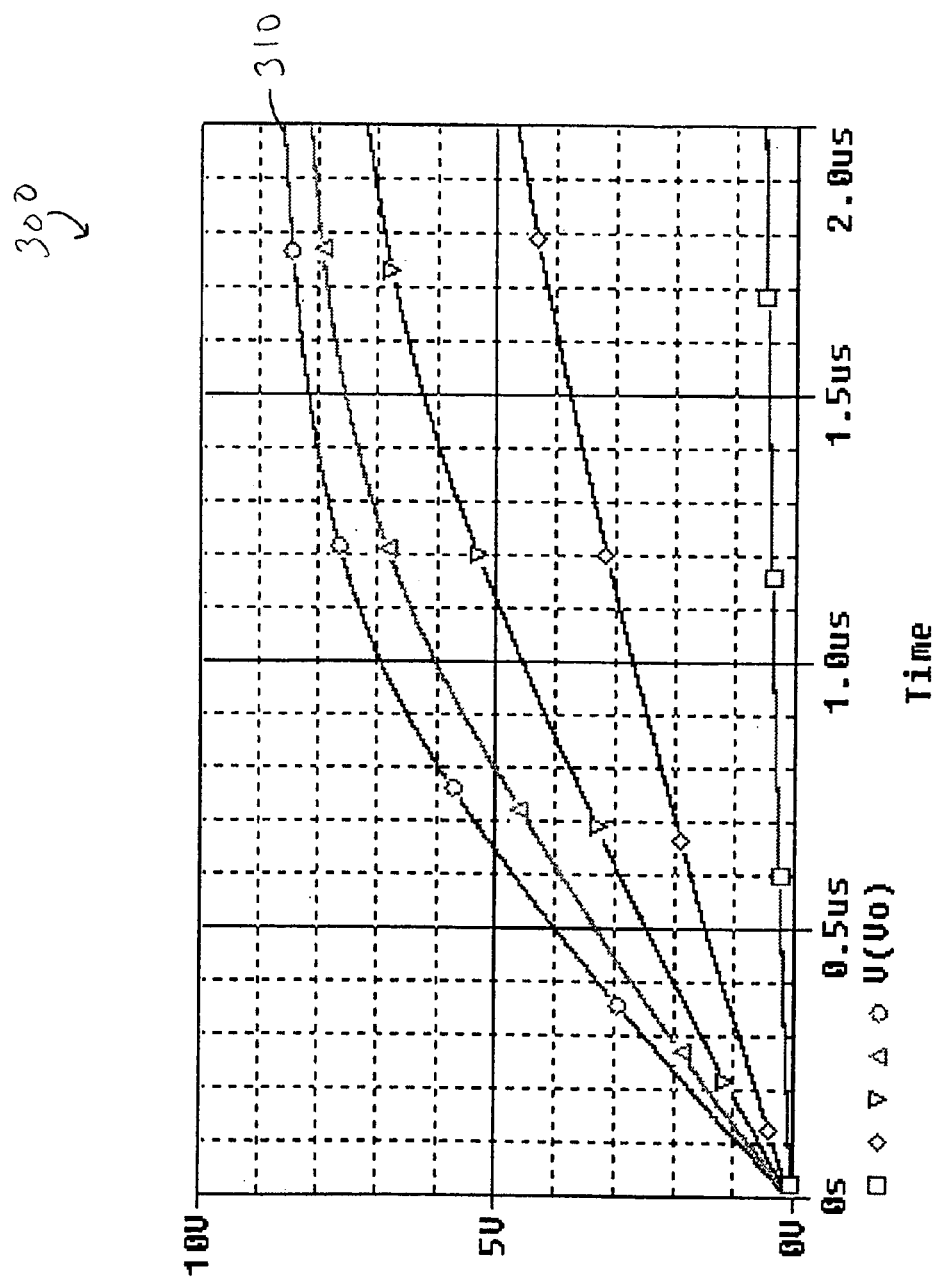
FIG. 3 is a plot of a simulation of the 4-stage charge pump of FIG. 2 with input source amplitude Vp=3.0V at 915 MHz.

The functionality of the topology has been verified by simulation using state-of-the-art MOS models (level-49) for both NMOS and CMOS versions, at input signal frequencies as high as 1.0 GHz. The performance of the topology is represented by the plot 300 of FIG. 3, which is a plot of voltage vs. time for a plurality of charge pumps with varying MOS transcapacitance areas. FIG. 3 indicates that, for the 4-stage example shown in FIG. 2, the output voltage level is at a single polarity and is several times the amplitude of the input source. For the curve 310 representing the largest MOS transcapacitance area, the output voltage is approximately 8.5 volts for an input voltage of 3.0 volts. This is a multiplication factor of 8.5/2.3≈2.8 (as compared to an ideal multiplication factor of 2*N=8 for a four stage charge pump).

Figure 4:
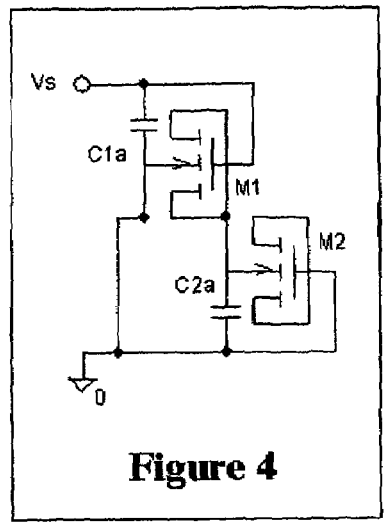
FIG. 4 is a schematic diagram of a single stage nMOS charge pump of the form shown in FIG. 1 to which collateral capacitances have been added to enhance the performance of the charge pump.
Figure 5:
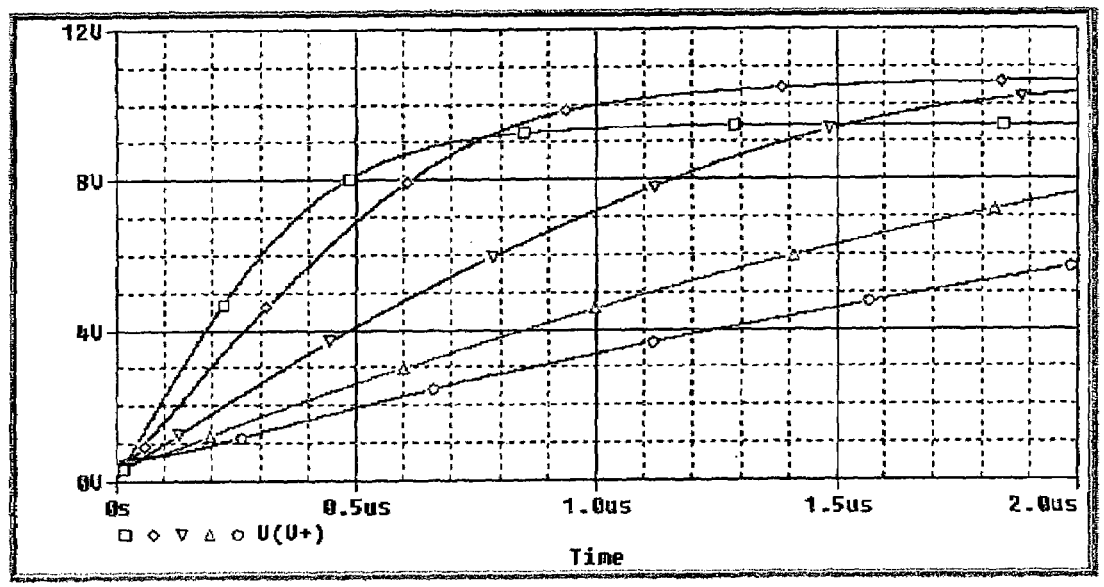
FIG. 5 is a plot of a simulation of a 4-stage charge pump of the form of FIG. 2 which has been enhanced through the addition of collateral capacitances in the manner shown in FIG. 4, with input source amplitude Vp=3.0V at 915 MHz.

Although one aspect of inventive charge pump described herein is that collateral capacitances and diodes are not required, the invention should not be understood to preclude the use of other components to enhance or modify the charge pump output. For example, as shown in FIG. 4, collateral capacitances may be included in the charge pump stages. In the example of FIG. 4, a capacitance of a size equal to that of the MOS capacitance is deployed across each of the MOS transcapacitances (i.e., across the body and gate terminals of each transistor). When this construct is extended to a multiple stage topology, such as a four stage charge pump of the form illustrated in FIG. 3, it results in an enhancement of the voltage output as reflected by FIG. 5.

Obviously, numerous other modifications and variations of the present invention are possible in light of the above descriptions. It is therefore to be understood that within the scope of the appended claims, the invention may be practiced otherwise than as specifically described herein.

What is claimed is:

1. A charge pump comprising:
    a plurality of stages including at least a first stage and a last stage, each of the stages comprising
        a first transistor having a first source terminal, a first drain terminal, a first gate terminal and a first body terminal;
        a second transistor having a second source terminal, a second drain terminal, a second gate terminal, and a second body terminal;
    wherein each transistor of each stage, except for the second transistor of the last stage, has its source and drain terminals connected to each other and to a body terminal of a next transistor;
    wherein the first transistor of each stage has a first gate terminal connected to an alternating polarity voltage source and the second transistor of each stage has a second gate terminal connected to ground; and
    wherein the first transistor of the first stage has a first body terminal connected to ground; and the second transistor of the last stage has a second source terminal and a second drain terminal connected to an output terminal of the charge pump.

2. The charge pump of claim 1, wherein the transistors are n-MOS (metal-oxide-semiconductor) transistors.

3. The charge pump of claim 1, wherein the transistors are p-MOS transistors.

4. The charge pump of claim 1, wherein a total number of stages is 4.

5. The charge pump of claim 1, further comprising plurality of stages in addition to the first and last stages.

6. The charge pump of claim 1, wherein the transistors are configured in a push-pull topology of nMOS and pMOS stages, otherwise identified as a CMOS technology implementation.

7. The charge pump of claim 1, wherein the voltage source provides a radio frequency signal.

8. The charge pump of claim 1, wherein the voltage source provides a single phase, alternating polarity signal.

9. The charge pump of claim 1, wherein each of the stages consists of a first transistor and a second transistor.

10. A method for making a charge pump comprising the steps of:
    providing at least one stage comprising
        a first transistor having a first source terminal, a first drain terminal, a first gate terminal and a first body terminal;
        a second transistor having a second source terminal, a second drain terminal, a second gate terminal, and a second body terminal;
    connecting the source and drain terminals of each transistor of each stage, with the exception of the source and drain terminals of the second transistor of a last stage, to each other and to a body terminal of a next transistor;
    connecting a gate terminal of the first transistor of each stage to an alternating polarity voltage source;
    connecting a gate terminal of a second transistor of each stage to ground;
    connecting the body terminal of the first transistor of a first stage to ground; and
    connecting the second source terminal and the second drain terminal of the second transistor of the last stage to an output terminal of the charge pump.

11. The method of claim 10, wherein the transistors are n-MOS (metal-oxide-semiconductor) transistors.

12. The method of claim 10, wherein the transistors are p-MOS transistors.

13. The method of claim 10, wherein the transistors are configured in a push-pull topology of nMOS and PMOS transistors.

14. The method of claim 10, wherein the voltage source provides a radio frequency signal.

15. The method of claim 10, wherein the voltage source provides a single phase, alternating polarity signal.

16. The method of claim 10, wherein a single stage is provided, the single stage being both the first stage and the last stage.

17. The method of claim 10, wherein a plurality of stages are provided.

18. The method of claim 10, wherein three stages are provided.

19. The method of claim 10, wherein a total number of stages is 4.

20. The method of claim 10, wherein each stage consists of a first transistor and a second transistor.

21. A passive change pump comprising:
    an even-numbered sequence of transistors, each transistor in the sequence other than the last transistor having a source and drain connected to a body terminal of a next transistor in the sequence, the gate of each odd-numbered transistor in the sequence being connectable to an alternating polarity voltage source, and the gate of each even-numbered transistor in the sequence being coupled to a neutral terminal of the alternating polarity voltage source.

22. The passive charge pump of claim 21, wherein the charge pump consists of the even-numbered sequence of transistors.

* * * * *